United States Patent [19]

Jikihara et al.

[11] Patent Number: 4,990,907
[45] Date of Patent: Feb. 5, 1991

[54] METHOD AND APPARATUS FOR DATA TRANSFER

[75] Inventors: Masami Jikihara, Yamato; Shigeo Tsujioka, Yokohama; Hiromichi Enomoto, Hadano; Tetsuya Mochida; Masataka Kobayashi, both of Yokohama, all of Japan

[73] Assignees: Hitachi, Ltd., Tokyo; Hitachi Microsoftware Systems, Inc., Yokohama, both of Japan

[21] Appl. No.: 231,000

[22] Filed: Aug. 11, 1988

[30] Foreign Application Priority Data

Aug. 19, 1987 [JP] Japan .................. 62-204066

[51] Int. Cl.$^5$ .............. H04Q 3/00; H04J 3/02
[52] U.S. Cl. ................. 340/825.5; 340/825.2; 340/825.51; 370/85.6
[58] Field of Search ............. 370/85, 91, 100, 108, 370/85.6, 91, 85.11; 340/825, 825.14, 825.2, 825.5, 825.51; 364/131, 132; 371/33

[56] References Cited

U.S. PATENT DOCUMENTS

| 3,988,716 | 10/1976 | Fletcher et al. | 370/100 X |
| 4,408,300 | 10/1983 | Shima | 340/825.5 X |
| 4,486,750 | 12/1984 | Aoki | 340/825 |
| 4,621,360 | 11/1986 | Inoue | 340/825.5 X |
| 4,831,358 | 5/1989 | Ferrio et al. | 340/825.5 |

Primary Examiner—Ulysses Weldon
Attorney, Agent, or Firm—Antonelli, Terry, Stout & Kraus

[57] ABSTRACT

A bus master and a plurality of bus slaves are connected through a data bus and a control bus, and data transfer of hand shake system is performed. In the control bus, at least data strobe signal from the bus master to the bus slave and data confirmation signal from the bus slave to the bus master are transmitted. The data strobe signal from the bus master is one inputted to a bus strobe control circuit. The data confirmation signal from the bus slave is also inputted to the bus strobe control circuit, and the control circuit supervises level of the data confirmation signal being asserted and confirms negation, and then asserts the data strobe signal to the bus slave. Thereafter, a next data transfer is started.

7 Claims, 2 Drawing Sheets

DSS-N101(TO BS3)

ACK-N102(FROM BS3)

$A(1-e^{-\frac{t}{CR}})$

THRESHOLD VOLTAGE

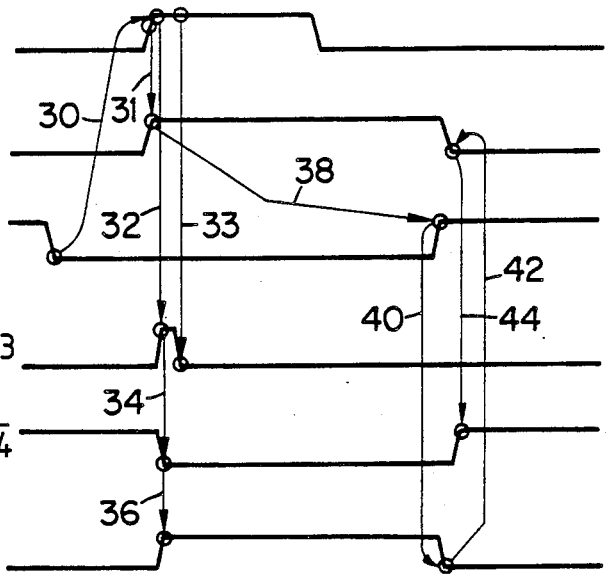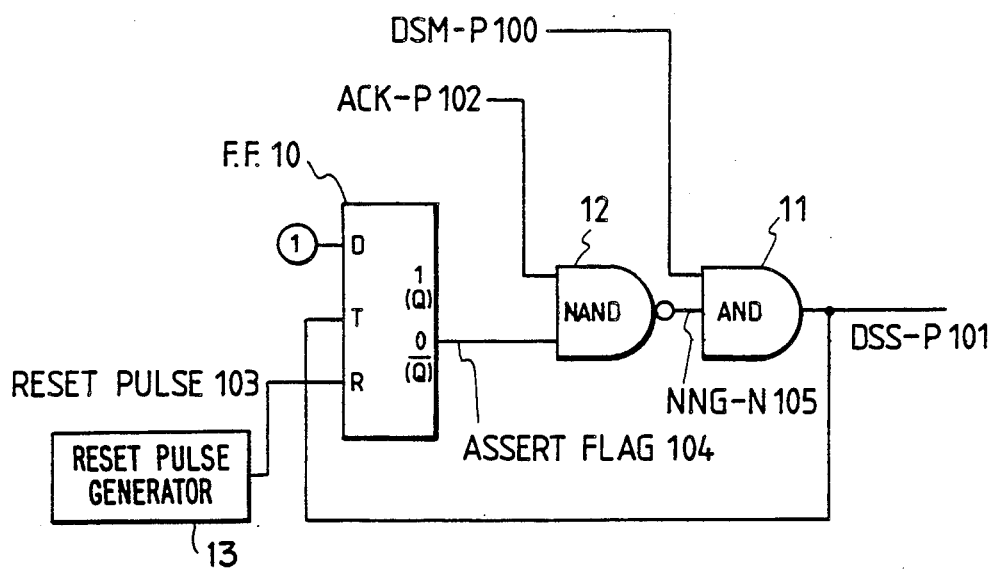

METHOD AND APPARATUS FOR DATA TRANSFER

BACKGROUND OF THE INVENTION

The present invention relates to a method and apparatus for data transfer between a bus master and a bus slave in a computer system, wherein the bus master is a central processing unit (hereinafter referred to as "CPU"), an input/output device (hereinafter referred to as "I/O device") or the like, and the bus slave is a memory or the like.

In the prior art, for example, as shown in Japanese patent application laid-open No. 61-234450 "Processor", since the timing of the negation of the data confirmation signal of the immediately preceding data transfer cycle is performed within a predetermined time specified as electric characteristics, the timing of the assertion of the data strobe signal is set to be delayed after the predetermined time.

In the hand shake system of the prior art, negation of the data confirmation ACK signal is performed within a predetermined time specified as electric characteristics after the data strobe signal DSS is negated indicated by arrow 20 in FIGS. 2A-2B, and the next data transfer is started by the strobe signal being asserted after the above-mentioned predetermined time. Most of the predetermined time is proportional to the product of the load capacitance C of the data confirmation signal line and the pull-up resistance R, and since the load capacitance C is varied as the connection number of the bus slave is increased or decreased, the predetermined time must be estimated to maximum value and the upper limit of the data transfer speed is specified.

That is, in the structure of the prior art, the bus master asserts the data strobe signal DSS at the data transfer starting time and informs the bus slave of it. The bus slave asserts the data confirmation signal ACK after the data transmission to the data bus at the data read state and after the receiving of data from the data bus at the data write state, and informs the bus master of it. The bus master negates the data strobe signal DSS after the receiving of data from the data bus at the data read state and after the outputting of the data to the data bus at the data write state. The bus slave detects that the data strobe signal DSS is negated, and stops the output of data to the data bus at the data read state and also negates the data confirmation signal ACK indicating the data transfer of one time is finished. In this case, since the data confirmation signal ACK is driven so that it does not collide with signals of a plurality of bus slaves, the signal line of the ACK is constructed with a three-state driver and connected to a pull-up resistance.

In this construction, after the data strobe signal DSS is negated, the timing chart of negation of the data confirmation signal ACK is shown in FIG. 2B. The time spent after the negation of the bus slave until the data confirmation signal ACK exceeds a threshold voltage is proportional to the product of the load capacitance C of the data confirmation signal ACK and the pull-up resistance R, and the load capacitance C is varied as the number of bus slaves connected to the ACK signal line is increased.

In fact, when R=3. 8 k ohms and C=100 pF, the time becomes about 200 nS, and when C=200 pF, it becomes about 400 nS. In this case, if the data strobe signal for a next data transfer is asserted before the data confirmation signal ACK exceeds the threshold voltage, error operation will be produced. In other words, the data strobe signal DSS is not to be asserted before the data confirmation signal exceeds the threshold value as indicated by arrow 22 in FIGS. 2A-2B. Consequently, in the construction of the prior art, the assertion timing of the data strobe signal must be sufficiently delayed. As a result, the data transfer speed cannot be increased.

SUMMARY OF THE INVENTION

An object of the invention is to provide a data transfer method and apparatus for controlling assertion of a data strobe corresponding dynamically to a variation in the number of bus slaves connected to a bus master, to improve the data transfer speed.

Another object of the invention is to provide a data transfer method and apparatus of a hand shake system wherein the assertion timing of the data strobe is dynamically optimized, thereby significantly improving throughput of the system.

In order to attain the foregoing objects, a data transfer method and apparatus is provided in the invention, wherein negation of the data confirmation signal from the bus slave to the bus master is confirmed, and then the data strobe signal from the bus master to the bus slave is asserted and the next data transfer is started.

Further, the invention provides a data transfer method and apparatus having a data strobe control circuit, wherein the data strobe signal from the bus master is received, and while the data confirmation signal from the bus slave is asserted, the assertion of the data strobe signal to the bus slave is inhibited.

In other words, while the data strobe signal from the bus master is received and the data strobe signal is negated and also the data confirmation signal from the bus slave is asserted, the assertion of the data strobe signal to the bus slave is inhibited, thereby improving the data transfer speed of the system in dynamic correspondence to the number of bus slaves connected to the bus master.

BRIEF DESCRIPTION OF THE DRAWINGS

FIGS. 3A to 3F are timing charts illustrating operation of a data strobe control circuit in the block of the embodiment of the invention in FIG. 1; and FIG. 4 is a block diagram illustrating an embodiment of the data strobe control circuit in the system of the invention in FIG. 1.

DETAILED DESCRIPTION OF THE PREFERRED EMBODIMENTS

Figures 1, 2A, 2B:
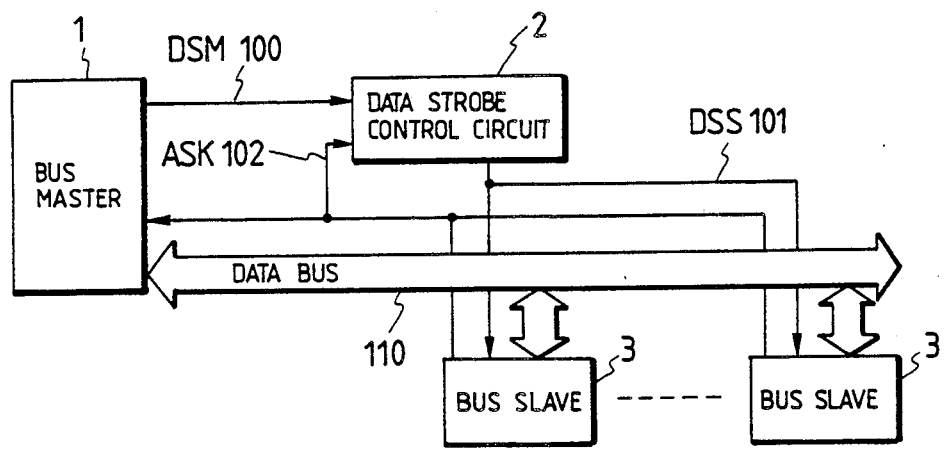
FIG. 1 is a block diagram of a microprocessor system using a data transfer system of the invention.
FIGS. 2A, 2B are timing charts illustrating relation of negation of data confirmation signal ACK between a bus master and a bus slave and assertion of data strobe signal in the data transfer system of the invention.

FIG. 1 shows an embodiment of a microprocessor system using a data transfer system of the invention. In FIG. 1, numeral 2 designates a data strobe control circuit according to the invention, and data strobe signal DSM 100 from a bus master 1 is transmitted to the data strobe control circuit 2, and also data confirmation signal ACK 102 is transmitted from a bus slave 3 on a signal line. The strobe control circuit 2 transmits data strobe signal DSS 101 on a signal line to the bus slave 3.

The data strobe control circuit 2 confirms that the data confirmation signal ACK 102 exceeds a threshold voltage, and then generates data strobe signal DSS 101 to the bus slave 3 based on the data strobe signal DSM 100 from the bus master 1. FIG. 4 is a detailed diagram of an embodiment of the data strobe control circuit 2 according to the invention. In FIG. 4, numeral 10 designates a flipflop circuit, numeral 11 designates an AND circuit, and numeral 12 designates a NAND circuit.

Operation of the embodiment will be described referring to timing charts in FIGS. 3A–3F. Arrows 30–42 are shown in FIGS. 3A–3F indicating transitions in the operation of the invention. First, if the data confirmation signal ACK 102 (FIG. 3C) from the bus slave 3 is asserted, the bus master 1 negates the data strobe signal DSM 100 (FIG. 3A) as indicated by arrow 30. Corresponding to this, in the data strobe control circuit 2, assertion of the data strobe signal DSS 101 (FIG. 3B) is inhibited by the NAND circuit 12 and the AND circuit 11 as indicated by arrow 31. Also at the negate time of the data strobe signal DSM 100, a reset pulse 103 shown in FIG. 3D is generated by a reset pulse generator 13 and inputted to a reset terminal of the F.F. 10 as indicated by arrows 32 and 33, thereby an assert flag 104 (FIG. 3E) is reset as indicated by arrow 34.

In this state, while the data confirmation signal ACK 102 does not exceed the threshold voltage of NAND circuit 12, assertion inhibition signal NNG 105 (FIG. 3F) being output of the NAND circuit 12 is not varied as indicated by arrow 36. That is, under the condition that the data confirmation signal ACK 102 is asserted and the assert flag 104 is reset, the assertion of the data strobe signal DSS 101 is inhibited.

If the bus master 1 asserts the data strobe signal DSM 100 indicating the next data transfer is started, and if the data confirmation signal ACK 102 exceeds the threshold voltage, then the above-mentioned inhibition condition is not performed thereby causing the data strobe signal DSS 101 of the next data transfer to be asserted. That is, since the data confirmation signal ACK 102 being one input of the NAND circuit 12 exceeds the threshold voltage of NAND circuit 12, the assertion inhibition signal NNG 105 is reset as indicated by arrow 40 thereby causing the data strobe signal DSS 101 being output of the AND circuit 11 to be asserted as indicated by arrow 42. When the data strobe signal DSS 101 is asserted, the assert flag 104 being an output signal of the F.F. 10 is set as indicated by arrow 44.

The above-mentioned operation is performed in each data transfer cycle, thereby loss is not produced in the assertion timing of the data strobe signal DSS 101 to the bus slave 3 and the data transfer speed can be maximized.

As above described, according to the invention, in dynamic response to variation of the number of the bus slaves connected to the bus master, assertion of the data strobe at high speed can be realized and throughput of the data transfer can be improved.

As the microprocessor system becomes large scale, the support slot number of the I/O adaptor as the bus slave increases and therefore the variation width of the load capacity of the data confirmation signal cannot be ignored. Consequently, the dynamic optimization of the assertion timing of the data strobe of the invention can significantly improve the throughput of the system.

Although an example of the data strobe control circuit is shown in the embodiment, the invention is not limited to any particular circuit configuration.

What is claimed is:

1. A data transfer method of a hand shake system using a data bus between a bus master and a bus slave, a data strobe signal from said bus master to said bus slave, and a data confirmation signal from said bus slave to said bus master, said method comprising the steps of:
   asserting said data confirmation signal on a data confirmation signal line by said bus slave for a data transfer between said bus master and said bus slave;
   negating said data strobe signal on a data strobe signal line by said bus master in response to said assertion of the data confirmation signal from said bus slave;
   confirming negation of said data confirmation signal from said bus slave to said bus master; and
   starting a next data transfer between said bus master and said bus slave by asserting said data strobe signal after confirming the negation of said data confirmation signal.

2. A data transfer method according to claim 1, wherein said negation of said data confirmation signal is confirmed by discriminating means for discriminating whether a signal level of said data confirmation signal after said assertion of said data confirmation signal exceeds a threshold level.

3. A data transfer apparatus of a hand shake system wherein data transfer between a bus master and at least one bus slave is performed through a data bus, said apparatus comprising:
   means for transmitting a data strobe signal from said bus master to said bus slave on a data strobe signal line;
   means for transmitting a data confirmation signal from said bus slave to said bus master on a data confirmation signal line; and
   control means for receiving said data strobe signal from said bus master and for inhibiting assertion of said data strobe signal to said bus slave while said data confirmation signal from said bus slave is asserted.

4. A data transfer apparatus according to claim 3, wherein said control means comprises means for detecting whether said data confirmation signal being asserted exceeds a threshold value, and means for releasing the inhibition of assertion of said data strobe signal if it is detected that said data confirmation signal exceeds said threshold value.

5. A data transfer apparatus which is provided with a bus master, at least one bus slave, and a data bus between said bus master and said bus slave, said apparatus comprising:
   a first line where a data strobe signal from said bus master is transmitted;
   a second line where a data confirmation signal from said bus slave is transmitted to said bus master;
   data strobe control means to which said first and second lines are connected as inputs, said data strobe control means including means for confirming negation of said data confirmation signal and means for asserting said data strobe signal in response to negation of said data confirmation signal; and
   a third line where said data strobe signal is transmitted to said bus slave from said data strobe control means.

6. A data transfer apparatus according to claim 5, wherein said confirming means has means for detecting a signal level of said data confirmation signal.

7. A data transfer system of a hand shake type, in which data transfer between a bus master and at least one bus slave are performed through a data bus, said system comprising:
  first means for transmitting a strobe signal from said bus master to said bus slave;
  second means for transmitting a data confirmation signal from said bus slave to said bus master; and
  means for detecting a signal level of said data confirmation signal from said second means and for inhibiting assertion of said strobe signal of a current data transfer while said signal level of said data confirmation signal of a preceding data transfer does not exceed a predetermined threshold value.

* * * * *